United States Patent [19]

Grubbs et al.

[11] Patent Number: 4,645,814
[45] Date of Patent: Feb. 24, 1987

[54] RING OPENING POLYMERIZATION OF 3,4-DIMETHYLENE CYCLOBUTENE AND DERIVATIVES THEREOF

[75] Inventors: Robert H. Grubbs, S. Pasadena; Tim M. Swager, Pasadena, both of Calif.

[73] Assignee: California Institute of Technology, Pasadena, Calif.

[21] Appl. No.: 785,272

[22] Filed: Oct. 7, 1985

[51] Int. Cl.$^4$ ............................................. C08F 28/06
[52] U.S. Cl. ............................. 526/256; 526/259; 526/268; 526/280; 526/308
[58] Field of Search ............... 526/256, 259, 268, 280, 526/308, 169

[56] References Cited

U.S. PATENT DOCUMENTS 3,383,371  5/1968  Natta .................................. 526/308
3,567,699  3/1971  Natta .................................. 526/308

Primary Examiner—Paul R. Michl
Attorney, Agent, or Firm—Marvin E. Jacobs

[57] ABSTRACT

Highly conjugated, soluble polymers are prepared by ring opening polymerization of cyclobutenes of the formula:

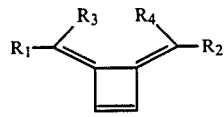

where $R_1$, $R_2$, $R_3$ and $R_4$ are individually selected from H, alkyl of 1 to 4 carbon atoms, alkoxy of 1 to 4 carbon atoms, phenyl or $R_3$ and $R_4$ are combined into a divalent $CR^5$, O, N=R or S group where $R^5$ is H, alkyl of 1 to 4 carbon atoms or alkoxy of 1 to 4 carbon atoms with a mild ring opening olefin metathesis catalyst such as a metal carbene. Random copolymers or block copolymers may also be prepared with comonomers capable of olefin metathesis polymerization such as norbornene or cyclopentene.

16 Claims, 13 Drawing Figures

SPECTRUM A

SPECTRUM B

RING OPENING POLYMERIZATION OF 3,4-DIMETHYLENE CYCLOBUTENE AND DERIVATIVES THEREOF

ORIGIN OF THE INVENTION

The present invention was made under National Science Foundation Grant No. CHE 8214668 and is subject to the provisions of the National Science Foundation Act.

TECHNICAL FIELD

This invention relates to the polymerization of 3,4-dimethylene cyclobutene and, more particularly, this invention relates to the preparation of highly conjugated polymers by the ring opening metathetical polymerization of 3,4-dimethylene cyclobutene and to the doping of these polymers to form highly conducting solids, which can be cast into films or precipitated as fibers.

CITED REFERENCES

1. D. G. H. Ballard, A. Courtis, I.M. Shirley, and S. C. Taylor, J. Chem. Soc., Chem. Commun., 954, (1983).
2. J. H. Edwards and W. J. Feast, Polymer, 21, 595, (1980).
3. R. H. Grubbs, "Comprehensive Organometallic Chemistry"; Vol. 8, Chapter 54, Sir G. Wilkinson ed. (1983).
4. L. R. Gilliom and R. H. Grubbs, to be published.
5. L. Canizzo and R. H. Grubbs, to be published.
6. T. J. Katz, S. J. Lee, M. Nair, E. B. Savage, J. Am. Chem. Soc. 102, 7940–42, (1980).
7. L. Skattebol, J. Org. Chem. 29, 29951–56, (1964).
8. L. Skattebol, Acta Chem. Scand., 17, 1683–93, (1963).

BACKGROUND ART

Conductive polymers have low density, are inexpensive to make, and have many potential applications. Conductive polymers have been considered prospective materials for switches, photovoltaic materials, light-weight high density battery materials, chemical sensors, transparent conductors, and many other devices. Unfortunately, most of the conductive polymers known to date are very insoluble and intractable and thus cannot be conveniently fabricated by current methods. Recently, tractable precursors to polyacetylene and polyparaphenylene have shown very promising results (1,2).

STATEMENT OF THE INVENTION

Synthesis of highly conjugated, soluble polymers is provided in accordance with the invention by ring opening metathesis polymerization.

A variety of catalysts is known to do olefin metathesis (3). The metal carbenes for many of the olefin metathesis catalysts are generated in situ. These catalyst mixtures typically consist of metals of high oxidation states and strong Lewis acids which are very active, and can cause crosslinking in highly conjugated systems, and, thus, are not useful for synthesizing soluble polymers. Catalysts for the present method of polymerization are mild ring opening catalysts, such as metal carbenes, that, in the presence of olefins, are in equilibrium with metallacyclobutanes. By using a cyclic olefin with ring strain such as dimethylenecyclobutene, the metallacycle will preferentially open to relieve the strain and, in the presence of excess cyclic olefin, form a polymer. This method is ideally suited for conductive polymer synthesis by virtue of the variety of potential monomers and that no saturation is introduced into the polymer upon polymerization.

The mild ring opening, olefin metathesis catalysts utilized in the invention to form non-crosslinked, soluble, highly conjugated polymers are selected from titanocene metallacyclobutane, titanocene alkyledene sources such as the Tebbe methylylene reagent, divalent tungsten complexed with at least four carboxyl groups, complexes of hexavalent tungsten halides and tetravalent tin alkyl compounds or complexes of hexavalent tungsten oxyhalides, tin alkyls and aluminum alkyls. Representative catalysts are illustrated in FIG. 1.

The preferred catalyst utilized in the invention is the titanocene metallacyclobutane. This catalyst requires no Lewis acid and therefore introduces little or no crosslinking into the polymer. This catalyst is in equilibrium with the metal carbene which is an active olefin metathesis catalyst (3). The metallacycle-carbene equilibrium can be varied greatly depending on the metallacycle. Titanocene metallacycles that are stable at 100° C. have been synthesized. This catalyst has been shown to give a living polymer with low dispersities in norbornene polymerization (4). Block copolymers with low dispersities can be synthesized with this catalyst.

Another aspect of the titanium metallacycle catalyst is the fact that the metal carbene reacts with a variety of carbonyls to give olefins. Polymerizations can be terminated with carbonyls, have been shown to endcap in high yield (5). This provides the potential to attach the polymer to other polymers or to reactive substrates by grafting and/or chain termination.

The cyclobutenes utilized in the invention have considerable ring strain, polymerize rapidly at low temperature by ring opening metathesis polymerization temperatures in condensed media. The cyclobutenes utilized in the invention have been selected on the basis of forming a polymer with a totally conjugated, unsaturated backbone. The cyclobutene monomers are selected from compounds of the formula:

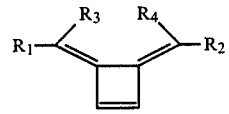

where $R_1$, $R_2$, $R_3$ and $R_4$ are individually selected from H, alkyl of 1 to 4 carbon atoms, alkoxy of 1 to 4 carbon atoms or monocyclic aryl such as phenyl or $R_3$ and $R_4$ are combined to form a divalent $-CR_2^5$, O, N—R or S group where $R^5$ is selected from H, alkyl of 1 to 4 carbon atoms or alkoxy of 1 to 4 carbon atoms. Representative compounds are

 V

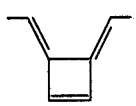 VI

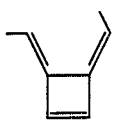

VII

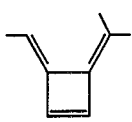

VIII

IX

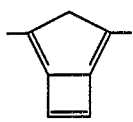

X

XI

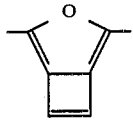

XII

During olefin metathesis polymerization action the cyclobutene monomer will polymerize to form a polymer containing a repeating unit:

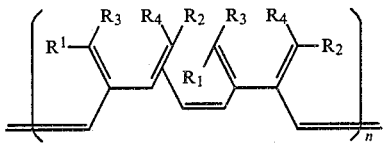

The polymer has live catalytic metal carbene ends that can be utilized for block polymerization or conversion to a carbonyl containing group such as a carboxyl or an ester group. The block comonomer can be selected to enhance the physical properties of the polymer. The comonomer is polymerizable by the organometallo end, usually by an olefin metathesis mechanism. Comonomers which copolymerize with the homopolymers of the invention to provide a more elastomeric and air stable polymer are norbornene, cyclopentene, and cyclobutene. Random copolymers can also be made of these polymers by polymerizing a mixture of monomers.

The unsaturated polymer can also be modified by Diels-Alder condensation to graft dienophilic monomers onto the backbone. For example, the benzophenone can be adducted or grafted onto the polymer to provide chromophoric properties. Maleic anhydride could be similarly added to provide the anhydride function capable of reaction with hydroxyl, amine and amide groups.

Electronic properties are enhanced by doping with material that extracts or adds electrons. Doping can be conducted with gaseous, liquid or solid dopants. For example, the polymer can be subjected to iodine or arsenic pentafluoride gases to extract electrons and render the polymer p-type. The polymers can also be doped in solution with a variety of oxidants such as $I_2$, $NOPF_4$, $NO_2PF_4$, $FeCl_3$ and $Br_2$. This method of doping allows the doped polymer to be cast directly into a film. N-type polymers can be prepared by reaction with metals such as NaK alloys and have been found to be soluble in polar solvent.

These and many others features and attendant advantages of the invention will become apparent as the invention becomes better understood by reference to the following detailed description when considered in conjunction with the accompanying drawings.

DETAILED DESCRIPTION OF THE INVENTION

Polymers are produced under oxygen excluding conditions by reacting the cyclobutene with catalyst in bulk or in the presence of solvent or diluent such as benzene. The catalyst can be added first to the reactor or can be formed in situ in solvent in the reactor before adding monomer. The catalyst is present in an amount of at least 1 percent by weight of the monomer which is usually an amount about 10 percent by weight of the solvent. Certain catalysts, such as the tungsten-carbonyl complex, may require presence of an initiator such as phenyl acetylene. The mixture may be degassed and stirred during reaction. The polymer is recovered by precipitation in non-solvent, such as methanol.

The soluble polymer is then dissolved in solvent, such as benzene, coated onto a substrate and dried to form a film. The film is then further modified by doping, thermal treatment and/or oxidative treatment.

Figure 1:
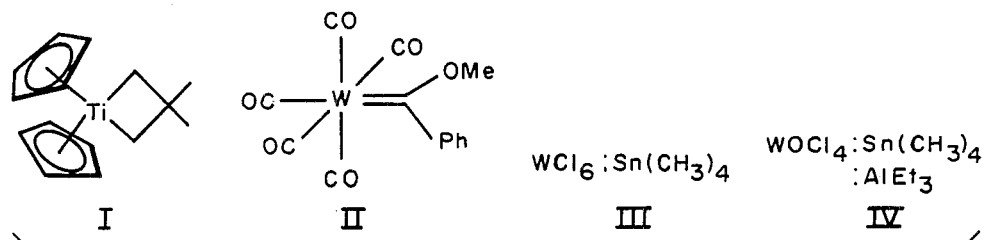
FIG. 1 is a set of structural formulas for representative ring opening catalysts useful in the method of the invention.
Figure 2:
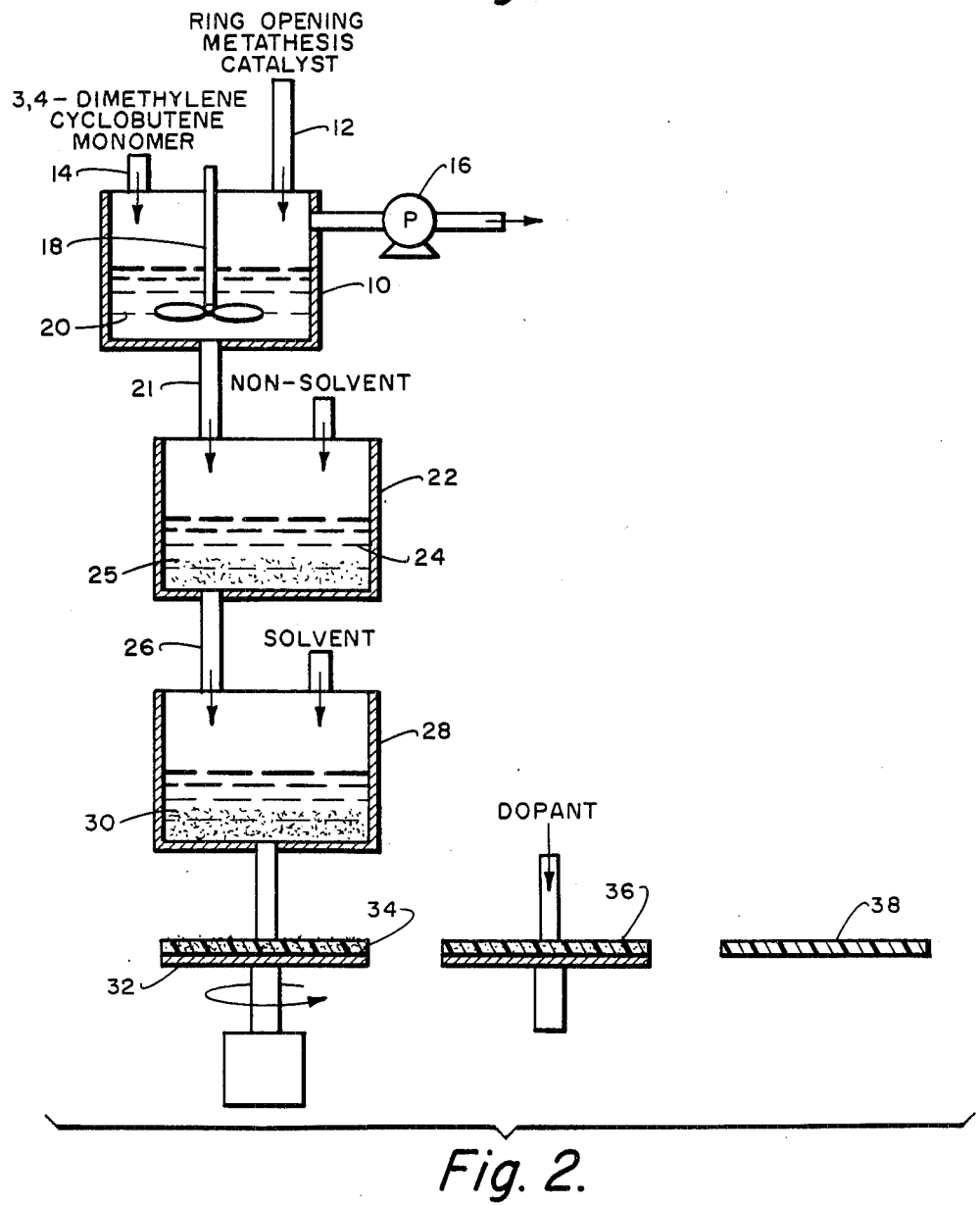
FIG. 2 is a schematic view of a process for forming a conductive film according to the invention.

Referring now to FIG. 2, a solution of ring opening catalyst is first added to the reactor 10 through line 12. The 3,4-dimethylene-cyclobutene is then added through line 14 to the reactor. The vacuum pump 16 and stirrer 18 are activated to degas the reaction media 20. After polymerization has proceeded a sufficient length of time, the reaction media 20 is fed through line 21 into tank 22 containing a body 24 of non-solvent such as methanol. The precipitated polymer 25 is fed through line 26 into tank 28 and redissolved in solvent 30. The solution is fed onto disc 32 which is spun to form a dry film 34. The film is then subjected to dopant from nozzle 36 to form a conductive film 38.

Examples of practice follow:

The solvents used with air sensitive materials were dry and oxygen free. All air sensitive materials were handled under inert atmosphere by use of schlenk techniques or in an inert atmosphere dry box. Doping was done under vacuum or inert atmosphere. All the AsF$_5$ doping was done on a vacuum line in a high air flow hood. Excess dopant was removed by pulling vacuum over the films for at least 2 hours. Infrared spectra were acquired on a Shimadzu IR-435 spectrometer. Samples were generally KBr pellets. Samples for the spectra of doped films were prepared by evaporating a polymer film on one of the windows of an IR gas cell. H$^1$ and C$^{13}$ NMR were acquired on Jeol FX-90 and GX-400 spectrometers, and UV-Vis spectra were obtained on a HP-8451A Diode Array spectrometer.

ESR spectra were taken on a Varian E-line Century Series spectrometer with an E-102 microwave bridge. Single and double integrals were achieved by collecting data on disk by use of a DEC PDP-8 computer and then transfering the data to the X-Ray VAX. Samples for ESR experiments were prepared by evaporation of benzene or chloroform solutions on a glass plate and then removed with a razor blade.

The best conductivity measurements were achieved on films that had been spin coated. Conductivities were made on these films with a commercially available pressed metal four point probe. The probe was in a colinear configuration with constant current applied through the outer contacts and voltage was measured through the inner two points. The reported conductivities were measured with currents (nA). Thicknesses were measured with a deck-tac.

SQUID measurements were made on a SHE instrument at the Southwestern regional facility at USC on films prepared in the same way as those used in ESR experiments. Sample holder calibration was done and its magnetism was subtracted. X-ray diffraction measurements were done on films evaporated from chloroform on a diffractometer developed at CIT.

Gas phase pyrolyses were done through a 12 inch oven through a pyrex tube packed with glass helices. The temperature of the oven was monitored with a thermocouple, and controlled by a Thermolyne temcometer input controller and a variac.

EXAMPLE 1

Synthesis of WOCl$_4$ (III)

40 gr of [Na$_2$WO$_4$](H$_2$O)$_2$ (0.12 mole) was refluxed for 24 hours in SOCl$_2$. The excess thionyl chloride was then pumped off to give an orange solid from which 28.7 g of WOCl$_4$ was sublimed for a yield of 70 percent.

EXAMPLE 2

Polymerization of 3,4-dimethylenecyclobutene (V) with WOCl$_4$ (III)

WOCl$_4$ (0.128 mmole) and Sn(CH$_3$)$_4$ (0.167 mmole) were allowed to react for 2 minutes in 8 ml chlorobenzene. The olefin (2.56) mmole was then added to the solution and allowed to react for 4 minutes. At this time precipitate was observed in the mixture and the polymerization was terminated by canulation into degassed methanol. A totally insoluble gray polymer was obtained in approximately 25 percent yield. IR data is interpreted as follows: bands at 1660, 850 cm$^{-1}$ indicate a vinylidene moiety; bands at 1620, 700, cm$^{-1}$ are characteristic of cis disubstituted olefins; a band at 1445 cm$^{-1}$ is indicative of a methylene group in a ring system.

EXAMPLE 3

Synthesis of films of V

Films of V can be synthesized by the following method. 0.175 mmole of WOCl$_4$ and 0.473 mmole of EtAlCl$_2$ were dissolved in 1 ml chlorobenzene and stirred at room temperature for 10 min. The solution was then spread around the inside of the reaction vessel to form a film of catalyst solution. This vessel was then cooled to −78° C. and monomer (V) (9 mmole) was added as a gas. The reaction was allowed to proceed for 5 min. and then terminated by washing the film with degassed MeOH to give a transparent yellow polymer film. Doping of these films gave highly conductive materials.

EXAMPLE 4

Synthesis of a mixture of VI and VII

Figure 10:
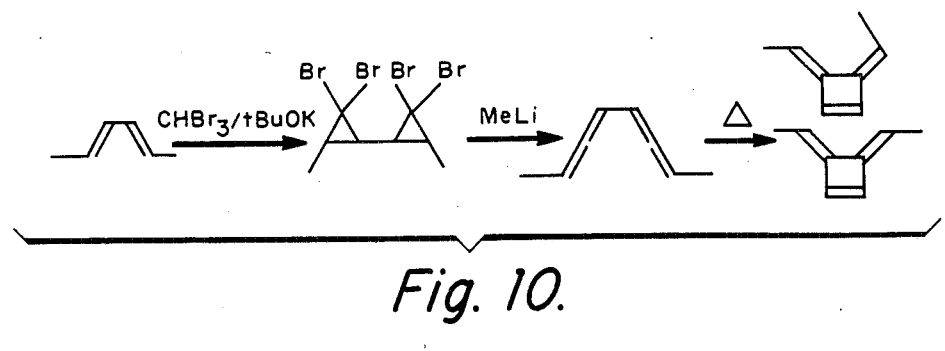
FIG. 10 is a reaction showing formation of a mixture of VI and VII.
Figure 11:
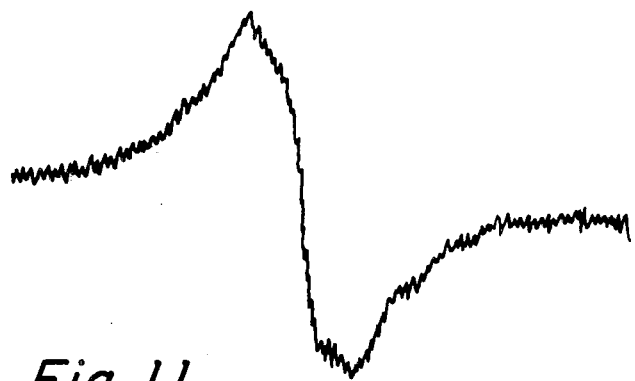
FIG. 11 is an ESR plot of an $AsF_5$ lightly doped polymer.

Reaction (FIG. 10) of compound XIII with one equivalent of MeLi (1.4 molar in ether) at −40° C. gave after aqueous workup, drying over MgSO$_4$ and removal of the solvent in vacuo, approximately 60 percent of an unstable light brown oil. C$^{13}$ NMR showed this reaction to contain two different allene products. This mixture of compounds was subjected to flash vacuum pyrolysis at 340° C. to give an orange oil that showed a multitude of different olefinic signals in the H$^1$ NMR. Some of the signals were the same as those reported in the literature, but it is clear that the mixture was extremely impure.

EXAMPLE 5

Polymerization of impure mixture of VI and VII 0.2 g (0.5 mmole) WOCl$_4$ and 0.10 g (0.6 mmole) Sn(CH$_3$)$_4$ were allowed to react in chlorobenzene (20 ml) for 2 minutes. At this time 2.5 g of the olefin mixture from Example 4 was added and allowed to react for 4 minutes. The solution was then canulated into methanol where the polymer precipitated to give a very light yellow polymer in 16 percent yield. H$^1$ NMR broad peaks at 5.92, 5.05, 2.25, 1.62, and 0.95 ppm.

EXAMPLE 6

Polymerization of VIII

Compound VIII was synthesized by the methods described in references 7 and 8, with path A giving an overall yield of 85 percent. The samples of this polymer used in the ESR studies and those showing the best conductivity were prepared in the following way. 70 mg of the titanocene metallacycle (I) was dissolved in 10 ml of benzene and stirred for approximately 20-30 seconds. The catalyst solution is then canulated into a solution containing 20 ml benzene and 2.5 g monomer that is being rapidly stirred. During the polymerization the reaction temperature, which was originally room temperature, rose noticeably, and after 5.5 minutes the polymerization was was terminated by canulation into degassed methanol. A 75 percent yield of polymer was obtained as a white fluffy powder which was soluble in a variety of solvents. H$^1$ NMR gave broad signals at 6.22, 1.76, and 1.48 ppm in CDCl$_3$. The peak at 6.22 is shifted to 6.78 in C$_6$D$_6$. C$^{13}$ NMR gave 134.71(s), 129.48(s), 125.7(d), 22.26(q), and 19.24(q). IR spectra shown in FIG. 14 are consistant with the proposed structure.

Block-copolymers can be formed with any comonomer that will undergo ring opening metathesis polymerization. Representative comonomers are norbornene, cyclopentene, cyclopropenes, cyclobutenes, etc. The copolymerization procedure depends on the stability of the metallacycle formed with the comonomer. If the comonomer forms a stable metallacycle, the nonconducting block is polymerized and the solvent and excess monomer is removed in vacuum, leaving the living polymer with a metallacycle on one end. If the comonomer does not form a stable metallacycle, then a ligand, B:, such as PR$_3$, NR$_3$ (where R is an organic group such as alkyl) or a Lewis base must be present to form a titanocene alkylidene-Lewis base adduct on one end of the living polymer. The living polymer may then be dissolved in solvent and, with the addition of cyclobutene monomer, a block polymer is formed as shown below:

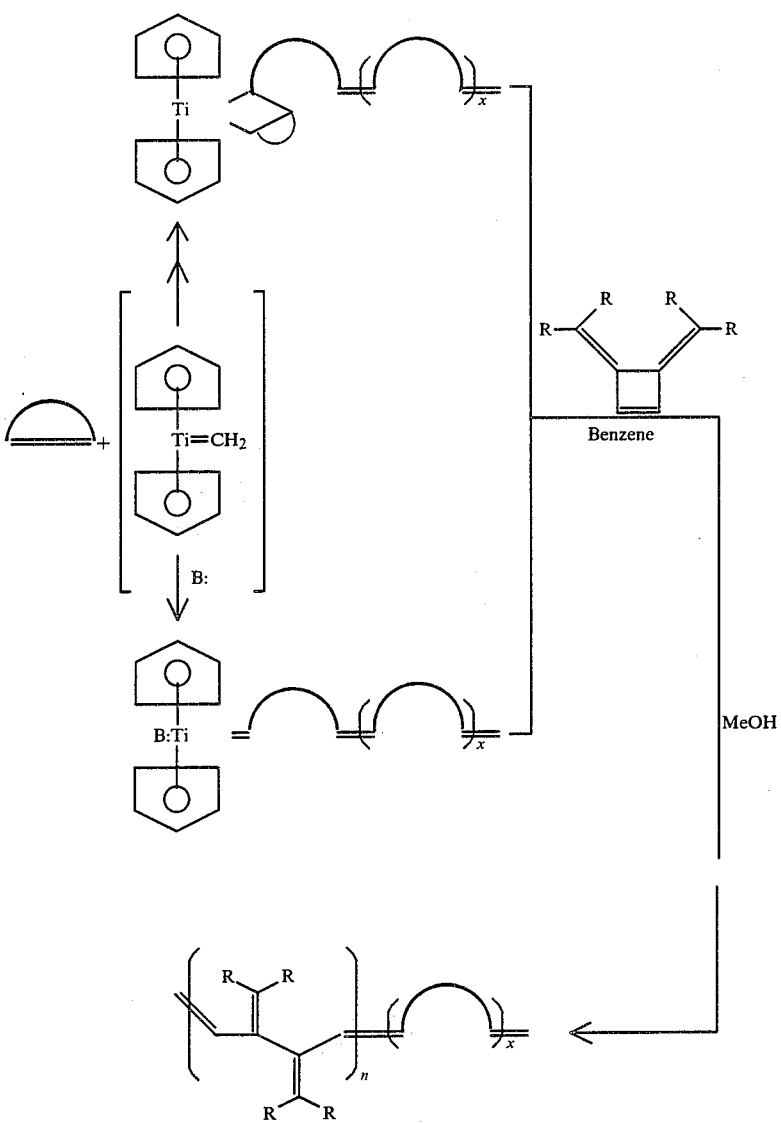

where n and x are integers and R is selected from R$^1$, R$^2$, R$^3$ and R$^4$.

The properties of the polymer of Example 6 were further modified by copolymerization of norbornene and cyclopentene by means of the titanium-carbene catalytic ends of the polymer.

EXAMPLE 8

All procedures were carried out under inert atmosphere. The titanocene metallocycle (0.077×10$^{-3}$ mole) was dissolved in 4 ml of a solution of norbornene in benzene (8.25 gr/50 ml) and stirred for 6 m at 65° C. At this time the reaction was pumped down over night at room temperature to remove excess monomer and solvent. The living norbornene polymer was then dissolved in 10 ml benzene and Compound VIII (3.1×10$^{-3}$ mole) was added and the solution was heated to 65° C. for 10 min. At this time the solution was precipitated in MeOH to give the block polymer as a white powder.

Block copolymers can be used to vary the material properties of the cyclobutene homopolymer. Blocks prepared with norbornene have elastomeric properties even when doped to metallic levels, and have an increased resistance to oxidative degradation when exposed to oxygen atmosphere. Norbornene blocks only show a slight decrease in conductivity after days in normal atmosphere, and retain good mechanical properties after weeks of aging.

Though the unsubstituted 3,4-dimethylene cyclobutene (V) did not polymerize with the titanocene metallacycle catalyst (I), this monomer can be polymerized with $WOCl_4:Sn(Me)_4$, $WOCl_4:AlEt_3$ or $W(CO)_5(OMe)Ph$ in good yield. The polymers generally isolated are highly insoluble gray powders. The lack of solubility is probably the result of high molecular weights and crystallinity. The polymer formed appeared to have cyclized, when 3,4-dimethylene cyclobutene polymerized at 50° C. for 4 days with $W(CO)_5(OMe)Ph$. In this case the polymer was soluble and gave $H^1$ NMR signals and infrared absorptions that support a cyclized structure. Upon comparing the infrared transmittance spectra with that of polymer (Example 1) formed with $WOCl_4$:Lewis acid, it can be seen that some of the cyclized product was produced also. It was also observed that when the Lewis acid was $AlEt_3$ that the amount of cyclized material was greater than that of the polymer produced when $Sn(CH_3)_4$ was employed. Thus, this cyclization may be catalyzed by Lewis acid.

The titanocene metallacycle again did not polymerize the mixture of monomer VI and VII. The ineffectiveness of this catalyst may be a result of impurities. The $WOCl_4:Sn(CH_3)_4$ catalyst did, however, polymerize this monomer to form soluble polymer. $H^1NMR$ of the polymer was what should be expected for the polymer of monomers VI and VII. There was excess saturated material in the spectra also. This saturated material may be the result of catalyst initiated crosslinking, or from side polymerization reactions. Polymers made with the high valent tungsten catalysts typically have extra saturation. Films of the polymer became black, shiny, and metallic upon doping with $I_2$.

Compound VIII polymerizes very rapidly and cleanly with the titanocene metallacycles to give soluble polymer with low dispersity in the molecular weights. The tungsten based catalysts also give the same polymer as determined by infrared spectroscopy. The bulk of the polymer obtained from the tungsten catalysts was insoluble; this is probably the result of high molecular weight and crosslinking. The soluble portion of the polymer contained only saturated material. Therefore, only polymer synthesized with the titanocene catalyst was characterized further.

When precipitated from methanol the polymer is a fluffy white powder or a course fibrous solid depending on the concentration. The polymer is soluble in a variety of solvents including benzene, hydrocarbons, chloroform, dichloromethane, tetrahydrofuran, and diethylether. This polymer is air sensitive, and under prolonged exposure to air, it turns bright yellow and is soluble only in polar solvents.

Transparent, high quality, freestanding thin films can be formed by evaporation from solvent. These films have very good material properties and appear to be totally amorphous giving no x-ray diffraction. Scanning electron microscopy showed the morphology to be globular and continuous without cracks. These electron micrographs show some structure, with spherical humps all over the polymer surface.

Upon doping with oxidizing agents these films become black shiny and metallic. Thermo-electric measurements determined the charge carriers to be holes (cations). The best conductivity measured to date is 600 (ohm cm)$^{-1}$, and was from a film saturated with $I_2$. Conductivities as high as 185 (ohm cm)$^{-1}$ have been achieved on $AsF_5$ doped films. Conductivities for iodine doped films have been consistently in the 10's and 100's with average value of approximately 200 (ohm cm)$^{-1}$. These high conductivities are unprecedented and are even higher than those of polyacetylene doped with iodine. Factors that may contribute to this higher conductivity is that this polymer can be doped to higher levels than polyacetylene, and that this polymer is amorphous. Polyacetylene is semicrystalline and carrier species can be trapped at junctions between crystalline and noncrystalline phases.

Weight uptake measurements on this polymer saturated with $AsF_5$ indicate that approximately 1 electron per monomer unit had been removed from the valence band (assuming that the As species formed are $AsF_6^-$ and $AsF_3$). $I_2$ doping saturated at 0.5–0.9 $I_3^-$ ion per monomer unit. It is apparent that film thickness and preparation may have a large effect on the potential dopant concentration. This effect may also be a result of crosslinking in the polymer which gives saturated centers that reduce the number of double bonds that are potentially oxidizable. This crosslinking has been seen in samples on occasion by NMR, and these samples could not be doped as highly with iodine. The material properties of these polymers decay only at high dopant concentrations. Polymer films saturated with iodine are still flexible, while polymers saturated with arsenic pentafluoride are very brittle. The block copolymers maintain mechanical integrity even when highly doped.

Figure 3:
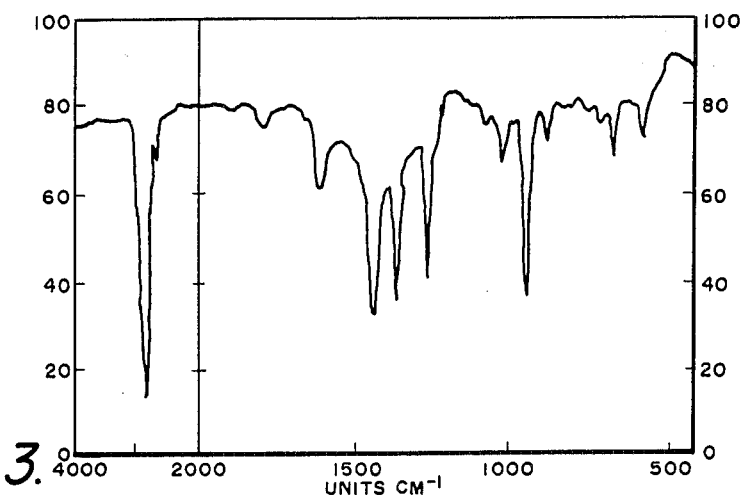
FIG. 3 is an IR spectra of the intrinsic polymer.
Figure 4:
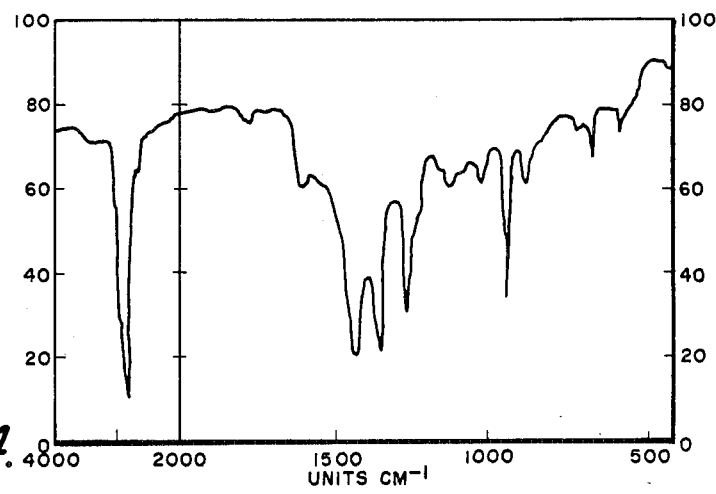
FIG. 4 is an IR spectra of polymer heavily doped with iodine.
Figure 5:
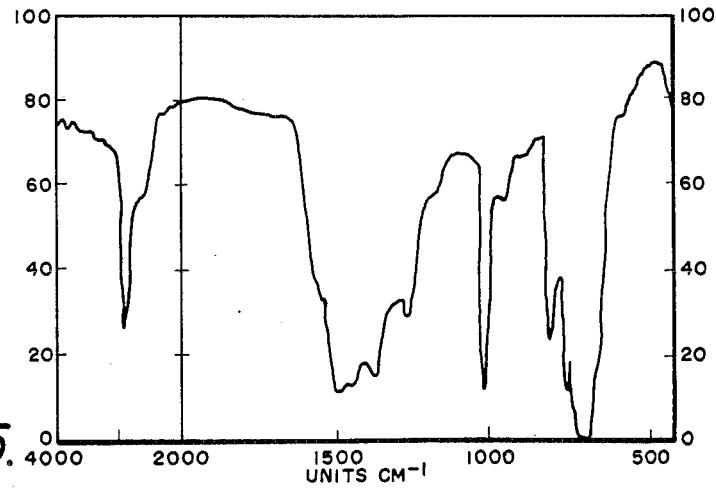
FIG. 5 is an IR spectra of polymer heavily doped with $AsF_5$.

Upon doping the polymer with either $AsF_5$ or iodine, a strong broad infrared absorbance centered at 1400 cm$^{-1}$ develops. Infrared spectra of an undoped film and films doped with $I_2$ (lightly doped) and $AsF_5$ (heavily doped) are shown (FIGS. 3, 4 and 5, respectively). The spectrum of the undoped polymer (FIG. 3) showed a strong band at 960 cm$^{-1}$ indicating a transolefin. The spectrum of the polymer lightly doped with iodine (FIG. 4) showed increased intensity and broadening of resonances from 1650–1300 cm$^{-1}$. The bands at 1040 cm$^{-1}$ and 700 cm$^{-1}$ in the spectrum (FIG. 5) of the polymer heavily doped with $AsF_5$ are attributable to arsenic oxides. Spectra of films doped with $AsF_5$ have the same bands as those doped with $I_2$ and are more intense. These spectra are complicated by arsenic oxides that form on the KBr plates from trace water.

Electron spin resonance is a very valuable tool in investigation of the mechanism of conduction. The number of spins in the system as a function of temperature, and dopant concentration is helpful in elucidating conduction mechanisms. The cross conjugated nature of this polymer and valency restrict the dimensions of the charge carrier species.

The undoped polymer gives a broad ESR signal with gaussian lineshape and a peak to peak line width of ($\Delta Hpp$) of 17.5 gauss and $1 \times 10^{-3}$ spins per monomer (determined by double integration against a standard). This is about 1/6 the number of spins observed for transpolyacetylene. In one experiment the sample was exposed to $I_2$ and the ESR signal monitored as a function of time. Initially the signal of the undoped polymer decayed to almost baseline noise. The sample was visually observed at this point and was tan to light brown in color. There is no increase in the number of spins upon doping until the dopant concentration reaches a level where approximately 1 electron per monomer unit is removed from the polymer. This has been demonstrated by double integration of films with varying dopant concentration and the data is tabulated in Table 1.

TABLE 1

| Dopant species | | Dopant ions/monomer | Spins/monomer |
|---|---|---|---|
| $AsF_5$ | $I_3^-$ | | |
| | | 0 | $1 \times 10^{-3}$ |
| | | 0 | $6 \times 10^{-3}$ |
| | X | .02 | $7 \times 10^{-3}$ |
| X | | .04 | $5 \times 10^{-3}$ |
| | X | .09 | $6 \times 10^{-3}$ |
| X | | .1 | $5 \times 10^{-3}$ |
| | X | .52 | $4.5 \times 10^{-3}$ |
| | X | .9 | $2 \times 10^{-2}$ |
| X | | 1 | $3 \times 10^{-1}$ |

The dopant concentration was determined by weight uptake measurements. From this data it can be inferred that the charged species in the polymer are all bipolarons until high dopant concentrations where some of the bipolarons dissociate to yield polarons.

Figure 12:
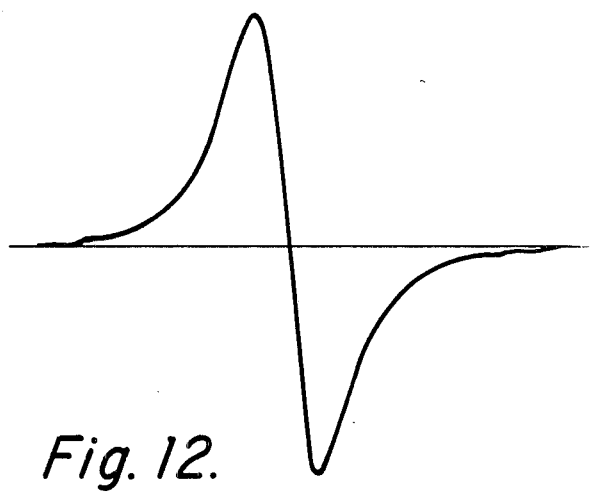
FIG. 12 is an ESR spectra of an $AsF_5$ heavily doped polymer.
Figure 13:
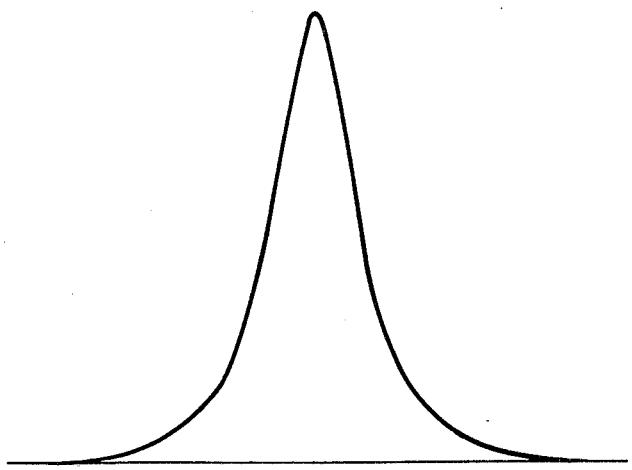
FIG. 13 is the integral of the spectra of FIG. 12.

The ESR signals of the polymers doped with $y < 0.9$ have a lineshape with linewidth about the same as the undoped polymer with the exception of an $AsF_5$ doped sample with $y=0.1$. This sample showed an unsymmetrical lineshape with a peak to peak width of 10 gauss. At high microwave power the signal can also be converted to a symmetric line width $\Delta H_{pp} = 10$ gauss. This type of behavior has been reported in polyacetylene and polythiophene, and has been attributed to nonhomogeneous doping. Polymer that is heavily doped with $AsF_5$ gives an isotropic ESR signal with Lorentizian lineshape and a $\Delta H_{pp} = 10$ gauss. A ESR spectra of polymer doped with $AsF_5$ ($y=1$) and its integral are shown in FIGS. 12 and 13. Polymer that was saturated with iodine was found to have a Lorentzian lineshape also and to exhibit some temperature dependence in its linewidth. These films showed a peak to peak linewidth of 7.75-B gauss at 298 K. which gradually broadens to 12 gauss at 11 K. Temperature dependence in ESR linewidths like this has been seen in polyacetylene, and has been attributed to motional narrowing of the signal at higher temperatures. The fact that the ESR is narrower in the heavily doped samples relative to that of the undoped polymer implies mobile spins. The symmetrical nature of the lineshape is indicative of homogeneous doping and is facilitated by the amorphous nature of the polymer films.

Saturation studies were carried out at 298 K. on the undoped polymer and polymer heavily doped with iodine and arsenic pentafluoride. It was found that the films saturated with $AsF_5$ gave no indication of saturating even at microwave powers as high as 6 mw. The undoped polymer and that saturated with iodine saturated at 0.03–0.04 mw. The fact that the $AsF_5$ doped polymer could not be saturated is consistent with a metallic state in which the lifetimes of the spins are very short. This short life-time is a result of the mobile delocalized nature of the spins allowing spin-flip relaxation by impurities.

The ESR integration of polymer saturated with iodine shows a Curie type temperature dependence giving approximately a factor of three decrease from 200 to 270 K. There was no measurable change in the number of spins in the sample from 270 to 310 K. The temperature dependent spin concentration of polymer heavily doped with arsenic pentafloride has not been investigated so thoroughly with ESR, yet temperature dependent magnetic susceptibility measured on a SQUID susceptometer was found to be nearly constant from 20–350 K. Determining the temperature dependence of the spin density is of importance in assigning the temperature independent Pauli susceptibility. Pauli susceptibility is an intrinsic property of metals and is proof of a metallic state. The Pauli paramagnetism is a result of free electrons at the Fermi energy responding to the perturbation of an applied magnetic field. Thus, the magnitude of the Pauli contribution to the magnetic susceptibility is proportional to the number of states at the Fermi level. To date the only conductive polymers to show a Pauli susceptibility are polyacetylene and polythiophene. The heavily doped polymers of the invention show very large Pauli susceptibilities. This large number of spins can be thought to arise from the fact that at dopant levels greater than one electron per monomer some of the bipolarons must be of the Coulombically unfavorable type. These biopolarons dissociate to give polarons.

Figure 6:
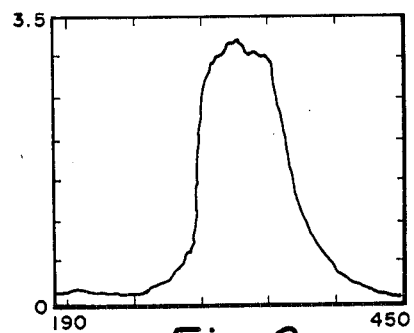
FIG. 6 is a UV-Vis spectra of a solution of polymer.
Figure 7:
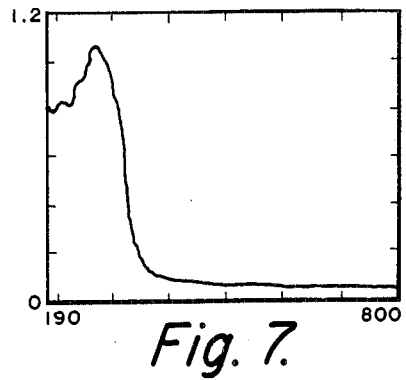
FIG. 7 is a UV-Vis spectrum of a film polymer.

UV-Vis spectra of a film and of a chloroform solution of this polymer are shown in FIGS. 6 and 7. The absorption band of the film is shifted to higher energy by approximately 0.55 eV. This shift could be due to the added stabilization gained in condensed phase such as $\pi$ stacking and would thus indicate electronic overlap between polymers. Alternatively, this shift may be the result of conformations adapted in the solid state.

The shape of the portion of absorption band of the film observed in the spectral window used more closely resembles a semiconductor than that of the solution spectra. Polyacetylene, for instance, shows a sharp absorption edge to a peak and then a decaying tail at higher energies. The edge of the absorption band of the film is at 322 nm, corresponding to a band gap (Eg) of 3.85 eV. This is rather large as compared to polyacetylene which has a band gap of approximately 1.4 eV and slightly larger than polypyrrole's gap of 3.2 eV.

Figure 8:
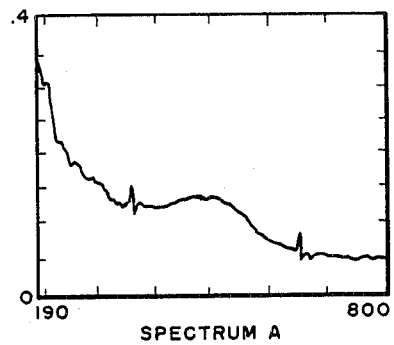
FIG. 8 is a UV-Vis spectrum of a lightly doped film.
Figure 9:
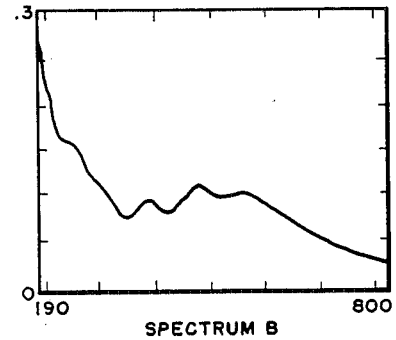
FIG. 9 is a UV-Vis spectrum of a heavily doped film.

Upon doping with $AsF_5$ or $I_2$ the band gap absorption band is shifted to lower wavelength while new transitions occur at higher wavelength. Visually, the films first become bright orange and very transparent and give the spectrum labeled spectrum A in FIG. 8. The polymers in this transparent form conduct also, but not as well as the heavily doped polymer.

It is to be realized that only preferred embodiments of the invention have been described and that numerous substitutions, modifications and alterations are permissible without departing from the spirit and scope of the invention as defined in the following claims.

We claim:

1. A method of polymerization comprising the steps of: reacting a cyclobutene monomer of the formula:

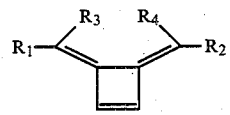

where $R_1$, $R_2$, $R_3$ and $R_4$ are individually selected from H, alkyl of 1 to 4 carbon atoms, alkoxy of 1 to 4 carbon atoms, monocyclic aryl or $R_3$ and $R_4$ are combined to form a divalent $CR_2^5$, O, N=R or S group where $R^5$ is selected from H, alkyl or 1 to 4 carbon atoms or alkoxy of 1 to 4 carbon atoms, with a mild ring opening, olefin metathesis catalyst to form a non-crosslinked soluble polymer containing repeating units of the formula:

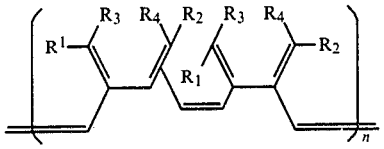

2. A method according to claim 1 in which $R_1$, $R_2$, $R_3$ and $R_4$ are selected from H or methyl.

3. A method according to claim 1 in which the monomer is selected from the following compounds:

V

VI

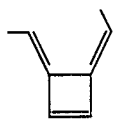
VII

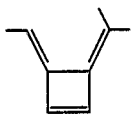
VIII

IX

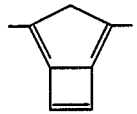
X

XI

-continued

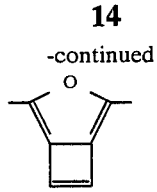
XII

4. A method according to claim 1 in which the catalyst is selected from titanocene metallocycles, divalent tungsten complexed with at least four carbonyl groups, complexes of a hexavalent tungsten halides and a tin alkyl, and complexes of tetravalent tungsten oxyhalides with a tin alkyl and an aluminum alkyl.

5. A method according to claim 4 in which the catalyst is a titanocene metalacyclobutane.

6. A method according to claim 5 in which the catalyst is a dicyclopentadienyltitanacyclobutane.

7. A method according to claim 1 in which at least 10 atomic percent of a comonomer capable of undergoing ring-opening, olefin metathesis polymerization so as to be copolymerizable with the cyclobutene monomer is present in the polymerization reaction media.

8. A method according to claim 7 in which the comonomer is selected from norbornene, cyclopropene, cyclobutene or cyclopentene.

9. A method according to claim 1 further including the step of reacting said soluble polymer with further monomer to form a block copolymer.

10. A method according to claim 1 further including the step of doping said polymer to form a more conductive polymer.

11. A polymer containing repeating units of the formula:

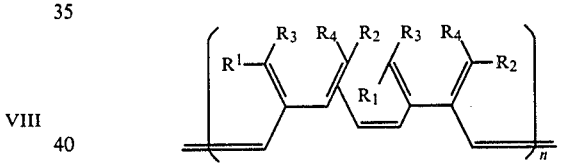

where $R_1$, $R_2$, $R_3$ amd $R_4$ are individually selected from H, alkyl of 1 to 4 carbon atoms, alkoxy of 1 to 4 carbon atoms, monocyclic aryl or $R_3$ and $R_4$ are combined to form a divalent $CR_2^5$, O, N=R or S group where $R^5$ is selected from H, alkyl of 1 to 4 carbon atoms or alkoxy of 1 to 4 carbon atoms.

12. A polymer according to claim 11 in which $R^1$, $R^2$, $R^3$ and $R^4$ are selected from H and methyl.

13. A polymer according to claim 11 containing random units of a comonomer capable of undergoing ring opening, olefin methathesis polymerization.

14. A polymer according to claim 13 in which the comonomer is selected from norbornene, cyclopentene, cyclobutene or cyclopropene.

15. A polymer according to claim 11 including block units of polymerized comonomer capable of ring opening, olefin metathesis polymerization.

16. A polymer according to claim 15 in which the comonomers are selected from norbornene, cyclopentene, cyclopropene or cyclobutene.

* * * * *